United States Patent [19]

Lee et al.

[11] 4,194,043

[45] Mar. 18, 1980

[54] WELDED ALUMINUM DIE CAST ARTICLE

[75] Inventors: John Lee, Rochester; Leo Golin, Clawson, both of Mich.

[73] Assignee: Chrysler Corporation, Highland Park, Mich.

[21] Appl. No.: 912,591

[22] Filed: Jun. 5, 1978

[51] Int. Cl.² .............................................. B23K 15/00
[52] U.S. Cl. .................................. 428/582; 123/52 M; 219/121 EM; 228/176; 228/263; 428/654
[58] Field of Search ............... 219/121 EM, 121 LM; 228/176, 165, 263 F; 164/110; 428/654, 582; 123/52 M; 29/527.5

[56] References Cited

U.S. PATENT DOCUMENTS

| | | | |
|---|---|---|---|
| 3,518,400 | 6/1970 | Galliran | 219/121 EM |
| 3,771,214 | 11/1973 | Binger et al. | 228/263 F |
| 3,824,368 | 7/1974 | Locke | 219/121 LM |
| 3,914,574 | 10/1975 | Hill et al. | 219/121 EM |
| 4,111,163 | 9/1978 | Ederer et al. | 123/52 M |

OTHER PUBLICATIONS

*Metals Handbook*, 8th Edition, 1971, vol. 6, pp. 292, 328–329 and 541.

*Primary Examiner*—Francis S. Husar
*Assistant Examiner*—K. J. Ramsey
*Attorney, Agent, or Firm*—Baldwin & Newtson

[57] ABSTRACT

A welded aluminum die cast article and method for making. Two or more die cast pieces are welded together to form a single part. The welding takes place along a welding seam characterized by formation of a relatively deep molten pool of metal within the weld seam during the welding operation.

11 Claims, 3 Drawing Figures

U.S. Patent   Mar. 18, 1980   4,194,043
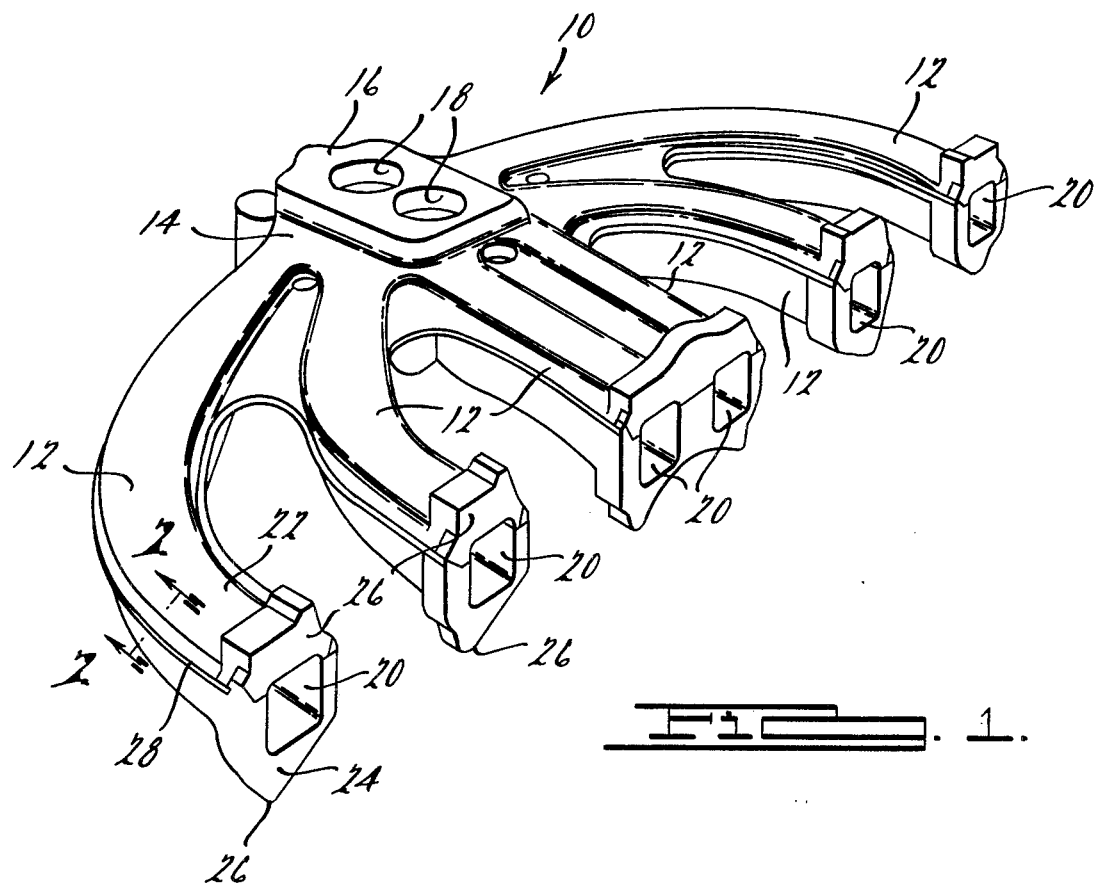
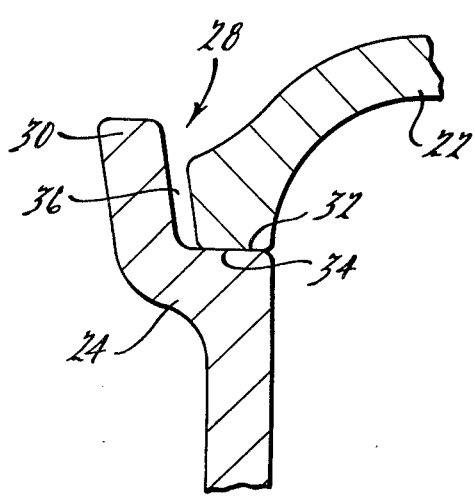
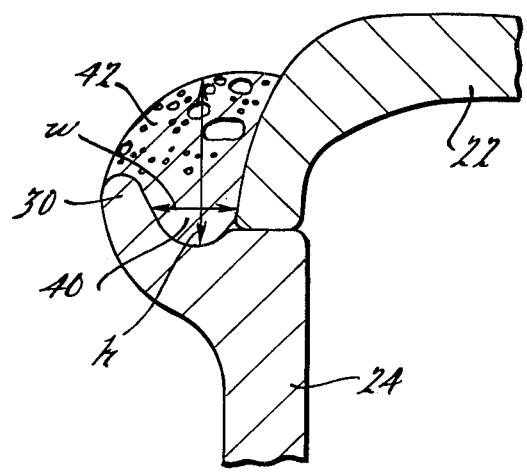

WELDED ALUMINUM DIE CAST ARTICLE

FIELD OF THE INVENTION

In one aspect this invention relates to die cast parts. In a further aspect this invention relates to welding technology and parts assembled by means of weldments.

PRIOR ART

Die casting is a well known casting method for high volume casting of parts having good dimensional stability and tolerance. In particular, this is true of high pressure die casting which is suitable for casting thin sections. However, die casting is not suitable for casting internal or enclosed curved passages such as those shapes commonly found on engine intake manifolds.

In an effort to produce aluminum parts for cars, several people have proposed die casting an aluminum intake manifold as two mating pieces and fastening the pieces of the manifold together by means of mechanical fasteners and adhesive material. This approach has not proved successful in providing a mechanical assembly which could withstand the operating conditions of temperature and atmosphere commonly present in the engine compartment of a vehicle.

Some form of metallurgical bonding such as welding or brazing would appear to be a better solution; however, conventional knowledge of high pressure die cast parts would lead one skilled in the art away from attempting to metallurgically bond die cast parts. *The Metals Handbook,* Volume I states, "Die-casting [aluminum] alloys are not recommended for welding, because of their inherently high porosity." In high pressure die casting of aluminum or other metals the cast material has entrained therein a large amount of gas contained in voids. Upon welding the porosity is opened and the resulting weld will not be metallurgically sound. Because of the problems it is a basic tenant of faith in the Metallurgical art that production welding of high pressure die cast parts was an unsound metallurgical and manufacturing process.

SUMMARY OF THE INVENTION

Briefly, the problems of welding the prior art die-cast materials to form an article have been solved by a method wherein a part is formed of two or more high pressure die cast portions. The portions of the part formed by high pressure die casting are adapted to mate with one another in a manner which provides a seam having a negligible clearance near the root of the seam. The portions are joined by forming a relatively thick deep molten pool of metal within the seam, thereby forming a weld seam which has essentially dense porosity-free metal at the root providing a sound metallurgical bond. Porosity in the weld seam will be concentrated in the upper level of the seam. The resulting weld seam provides a sound structure with the weld seam being relatively gas tight.

A BRIEF DESCRIPTION OF THE DRAWINGS

In the accompanying drawings:

FIG. 1 discloses a die cast intake manifold for a six cylinder engine having curved arms, all of the arms lying in a common plane;

FIG. 2 shows a section along the line 2—2 of FIG. 1 prior to welding and

FIG. 3 is a pen and ink drawing of a photomicrograph of a seam welded in accordance with this invention.

DETAILED DESCRIPTION OF THE PREFERRED EMBODIMENTS

Referring initially to FIG. 1 an intake manifold 10 suitable for use in a six cylinder in-line engine is shown having five arms 12 which are joined to common base area 14. The base area 14 has a raised boss 16 suitable for mounting a carburetor (not shown). A fuel and air mixture passes downward through the carburetor into one of two apertures 18 in the boss 16 and is drawn into interior passageways 20 contained within the arms 12 of the intake manifold. Such a structure is old in the art and forms no part of this invention. As shown, four of the arms 12 have a curved structure and the passageway contained therein is also curved. By die casting the intake manifold 10 as a top 22 and a bottom 24 piece, the walls of the intake manifold can be formed relatively thin, that is on the order of 2.5 to 3.0 mm. The part can be cast to a tolerance approximately plus or minus 0.75 mm. If the manifold could be die cast as a single piece, the walls of the arms would have to be much thicker in order to permit enough metal flow along the arms to make a sound casting. The terminal portions of the intake manifold arms 12 have upper and lower bosses 26 formed thereon, the bosses being used in mounting the intake manifold 10 to an engine block.

As is evident in the drawing, a seam 28 is formed near the upper surface of the top piece 22, the seam providing a narrow opening which is continuous about the periphery in the unwelded condition.

Referring to FIG. 2 a greatly enlarged section of the seam 28 is shown. The upper portion 22 of the intake manifold 10 is shown as fitting down inside a raised lip 30 formed on the lower portion 24 of the intake manifold. The mating surfaces 32, 34 of the upper and lower manifold portions respectively are essentially planar in nature and will fit virtually flush, even prior to welding to provide a seam which will not allow a rapid or easy passage of gas through the seam into a molten weld pool. The seam shown in FIG. 2 could have a lip height of approximately 0.5 mm, a lip thickness of approximately 2.5 mm and a gap 36 between the upper and lower manifold pieces of about 0.75 mm, such dimensions being suitable for a part the size of an intake manifold. Any space shown between the upper and lower portions of the manifold 10 are due to the irregularities in the casting tolerances and are not part of the design criteria.

The sketch of FIG. 3 shows the two pieces welded together by forming a molten pool of welded metal which was relatively deep compared to its width. As shown, formation of the weld pool has melted a portion of the lip 30 on the lower manifold 24 portion allowing it to flow into the gap 36 between the upper and lower manifold portions. The root 40 of the weld structure is essentially columnar in nature and non-porous. The gases liberated from the cast material during welding rise towards the upper surface 42 of the weld pool.

To ensure production of a good weld, the height of the seam measured down through the weld along the line designated H when divided by the width of the weld measured along the line W will generally be in the range of 1.5 or greater. Such a height to depth ratio provides sufficient molten metal for gases liberated from the porous casting to rise in the molten metal providing a sound as-cast essentially pore-free root. Preferably, the height to depth ratio will be two or greater. The greater the ratio, the more cast metal is deposited in the weld root.

The weld shown in FIG. 3 used a die cast aluminum alloy generally designated as 380, the alloy having nominal composition of (3.0–4.0% Cu, 1.0% Fe, 7.5–9.5% Si, 0.5% Mn, 0.1% Mg, 0.9% Zn, 0.5% Ni, 0.3% Sn, 0.5% other impurities, remainder Al) and is commonly available from major aluminum producers.

The weld shown in FIG. 3 was made using a production welder manufactured by "Leybold-Hereaus" where an assembled manifold was moved through a complex X-Y contour path under a stationary welding head. The welding head is a non-vacuum, high voltage electron beam welder using the standard electron beam generating head produced by Leybold-Hereaus and available under the designation NVW-35. The system operated in atmosphere with the head approximately 3 cm or greater away from the weld seam. The welding was done at a linear rate of approximately 12.7 to 19 cm/second using a helium effluent gas to shield the electron beam and without filler wire. The helium effluent is a preferred effluent in welding die cast parts since it appears to permit a more concentrated power application to the work at greater work to nozzle distances. The helium also appears to protect molten aluminum from reaction with atmospheric gases.

The welding technique of this invention can be performed with an energy source other than an electron beam. For example, a carbon dioxide laser can also be used, the laser providing a monochromatic source of light energy. Where a laser is used, a high ionization constant shield gas is also used. This prevents the ionization of air which robs power from the system. Also, where the laser is not shielded, the oxygen and nitrogen in the air are ionized and will react with the molten metal formed by the beam. One example of a suitable shield gas for a carbon dioxide laser is helium.

Welding using the above techniques consistently results in sound welds of the type shown in FIG. 3. It is apparent from the foregoing than an improved welded die cast part and a method for making same has been disclosed from the foregoing description. It is to be understood that various modifications and alterations of this invention can be made without departing from the scope and spirit of this invention, and that this invention is not limited to the illustrative embodiment described herein.

For example, the technique of this invention can be used to join a high pressure die cast portion to a gravity fed casting or wrought material where entrained gases are not normally a problem.

We claim:

1. A method of making a high pressure die cast part comprising the steps of:
   high pressure die casting a first portion of the part, said first portion having a flat surface forming a plane and having a raised lip projecting from said plane about the periphery of said first portion at an oblique angle to said plane;
   high pressure die casting a second portion of the part, said second portion being formed with a complementary flat surface which mates with the plane on said first portion; positioning the periphery of said second portion adjacent said lip with said flat surfaces mating in a manner which provides a seam having a negligible amount of gas flow into the seam;
   forming a relatively deep molten pool of metal from said portions within said seam at atmospheric pressure; and
   cooling said molten pool of metal to form a relatively dense material near the seam.

2. The method of claim 1 wherein said die castings are made from aluminum.

3. The method of claim 1 wherein said molten pool of metal is formed by a concentrated beam of energy.

4. The method of claim 3 wherein said concentrated beam comprises electrons which pass through a gas envelope maintained at atmospheric pressure.

5. The method of claim 3 wherein said concentrated beam comprises monochromatic light.

6. A method of welding a plurality of aluminum parts, at least one of the parts being a high pressure die casting along a seam comprising the steps of:
   clamping the parts into contact along the seam to be welded;
   contacting the seam with a collimated beam of energy to create a relatively deep pool of molten metal solely from the parts along said seam while shielding the pool of metal and beam in a gas maintained at atmospheric pressure; and
   cooling the pool of metal at atmospheric pressure to form a dense structure near the root of the weld.

7. The method of claim 6 wherein said collimated beam is an electron beam.

8. An article of manufacture comprising:
   a first portion having an enlarged raised lip portion projecting therefrom; and
   a second portion welded to said first portion by a single pass of welded seam, at least one of said portions being a high pressure die cast material having substantial porosity in the as cast condition and said welded seam having a height substantially greater than its width, said seam being substantially formed from said lip and having substantially all its porosity concentrated in its upper portion distal the weld root and being substantially dense at the weld root.

9. The article of claim 8 wherein said first and second portions are made from high pressure die cast aluminum.

10. The article of claim 8 wherein the ratio of height to width of said weld is at least two.

11. An intake manifold suitable for use with an internal combustion engine comprising: a die cast lower portion having a flat mating surface and a raised lip portion adjacent said mating surface;
   a die cast upper portion having a second flat mating surface adapted to engage the flat mating surface of said upper portion; a weld seam joining said upper and lower pieces along a portion of said flat mating surfaces, said weld seam having a height to depth ratio of at least 1.5 and an essentially pore free zone of as-cast metal near the root of the weld.

* * * * *